Patented July 19, 1932

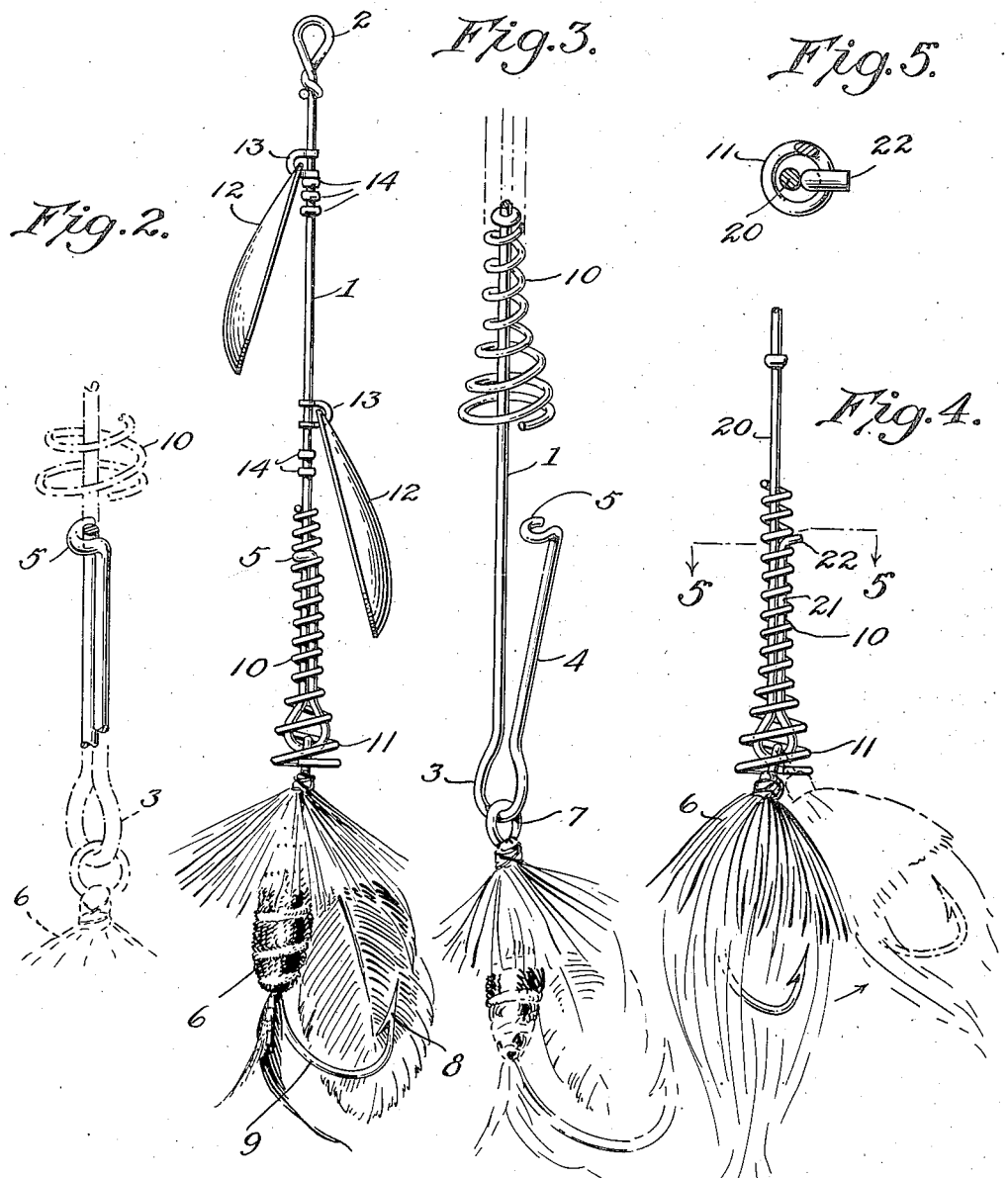

1,867,555

UNITED STATES PATENT OFFICE

HIRAM H. HILDEBRANDT, OF LOGANSPORT, INDIANA, ASSIGNOR TO THE JOHN J. HILDEBRANDT CO., OF LOGANSPORT, INDIANA

LURE ATTACHING MEANS

Application filed October 28, 1929. Serial No. 403,066.

This invention relates to fishing lures and has for its primary object to provide a simple and inexpensive construction for attaching such lures to the leader on which the usual spoons are mounted.

Another object of the invention resides in the provision of such a device which will allow a normal free operation of the fish hook, yet which limits the movements of the hook to the extent that its point may not become entangled with the line or leader by folding back upon the same.

Other objects and advantages of the invention will be apparent from the following description when taken in connection with the accompanying drawing, in which Figure 1 is a side elevational view of the device in assembled relation.

Figure 2 is a slightly enlarged detail view of a portion of the leader.

Figure 3 is a view similar to Figure 2 showing the leader in condition for the attachment or removal of a lure.

Figure 4 is a side elevational view of a slightly modified construction of leader and showing in dotted outline one of the limits of movement of the lure as restricted by the novel attaching means; and Figure 5 is a sectional view taken on line 5—5 of Figure 4.

Referring to the drawing in more detail, the numeral 1 indicates a metal rod or stem generally termed a leader and provided with a loop 2 on its upper end to which may be attached a fishing line.

The opposite end of the member or leader 1 is bent up to provide a loop 3 and an extension 4 which is in turn provided with a hook portion 5 adapted to engage about the body portion of the leader 1 and hold the member 4 in substantial contact with the body portion so as to provide a substantially closed loop at the lower end of the leader. This loop 3 serves to receive and form a pivot for an artificial casting lure 6 which is provided with a conventional eye 7 adapted to be threaded over the extension 4 and descend into the loop portion 3 of the leader.

With the construction as thus far described there is a liability of the spear portion 8 of the fish hook 9 engaging and becoming entangled with the body of the leader 1 by reason of the lure swinging into substantially parallel relationship with the leader. To prevent such an entanglement of the fish hook I provide a coil spring 10 provided with an enlargement 11 at its lower end. This coil spring, as indicated in Figure 2, encircles the lower end of the leader and the extension 4 of the loop 3, and projects beyond the loop 3 so as to provide a resilient abutment for the casting lure and prevent it from swinging through an angle greater than about 180 degrees. By this means the lure is prevented from swinging into a position substantially paralleling the leader 1 and any liability of the fish hook engaging the leader and thereby rendering the hook useless, is avoided.

It will be noted from an inspection of Figure 1 that the coil spring 10 receives between two of its adjacent coils the hook portion 5 so that the spring is in effect screw threaded onto the lower portion of the leader. When it is desired to remove the casting lure 6 for the purpose of substituting another lure or for any other purpose, the coil spring 10 may be rotated about its axis and thus screwed upwardly until its lower end is free of the hook 5, as indicated in Figure 3. In this position it will be apparent that the hook 5 may be disengaged from the body portion of the leader and permit the attachment or detachment of a lure. Furthermore, when the coil spring is threaded down into operative position as shown in Figure 1, it not only serves as an abutment for limiting the swinging movement of the lure body, but also serves as a secondary lock for the extension 4 of the loop 3, and thus prevents an accidental disengagement of the hook 5 from the body of the leader 1 with the attendant posssibility of loss of the casting lure.

The upper end of the leader may be provided with one or more spoons 12 which are pivotally connected to the slidably mounted eyes 13.

Beads 14 are slidably mounted on the leader, and serve as bearings for the eyes 13. The spring 10, in addition to the functions heretofore described also serves to prevent the beads 14 from sliding down into the lure engaging loop 3 when the extension 4 is disengaged from the body of the leader 1 for the purpose of changing a lure.

In the modified construction of the invention as shown in Figures 4 and 5, the leader 20 is identical with the form previously described, with the exception that the extension 21 of the lower loop portion is provided with an out-turned hook portion 22 rather than an in-turned portion as shown in Figures 1, 2 and 3. In this form of the invention, therefore, the coil spring 10 serves as the sole means for locking the extension 21 in engagement with the body portion of the leader 20. In other respects, however, the construction is identical with that previously described inasmuch as the coil spring 10 receives the out-turned hook portion 22 between two of its adjacent coils, and consequently provides a threaded connection between the coil spring and the leader. Moreover, the enlarged lower end 11 of the coil spring 10 extends beyond the lower end of the lure attaching loop and thereby serves as a resilient abutment for limiting the pivotal movement of the lure about the loop.

From the foregoing description taken in connection with the accompanying drawing it will be apparent to those skilled in the art that I have devised a fairly simple and inexpensive construction for attaching artificial casting lures to leaders or the like; that the attaching means not only serves as a resilient mounting to prevent entanglement of the fish hook with the leader or the fishing line, but also serves as a locking means to prevent accidental disengagement and loss of the lure; and that by reason of the construction as described the bead bearing members usually employed in such devices are always held against descent into the lure receiving loop, thus avoiding many difficulties now found in the removing or substitution of a lure from the fish hook.

While I have described the spring 10 for use in connection with fishing lures it will be readily understood that the same is useful in combination with any pivotal associated loops wherein it is desired to provide a resilient abutment to limit the swinging movement of the loops about each other and that therefore, the present invention is of more or less general application insofar as the combination of a coil spring and two connected or interlocked loops are concerned.

In accordance with the patent statutes I have described what I now believe to be the preferred form of the invention, but it is to be understood that various minor changes may be made in the details of construction without departing from the spirit of the invention, and all such changes or mechanical alterations are intended to be included within the scope of the appended claims.

What I claim as new and desire to secure by Letters Patent is:

1. In a device of the class described, a member provided with a loop on one end thereof, an extension on said loop adapted to be brought into contact with the body of said member, and a coil spring encircling said member and extension and having a part thereof extending beyond the loop.

2. In a device of the class described, a member provided with a loop on one end thereof, an extension on said loop adapted to be brought into contact with the body of said member, a hook portion on the free end of said extension adapted to interlock with said member, and a coil spring encircling said member and extension and threaded over said hook portion.

3. In a device of the class described, a member provided with a loop on one end thereof, an extension on said loop adapted to be brought into contact with the body of said member, a hook portion on the free end of said extension, a coil spring encircling said member and extension and threaded over said hook portion, said coil spring provided with an enlarged portion extending beyond the loop.

4. In a device of the class described, a member provided with a loop on one end thereof, an extension on said loop adapted to be brought into contact with the body of said member, a fish hook pivotally connected to said loop, a coil spring encircling said member and extension and having a part thereof extending beyond said loop to serve as a stop for the pivotal movement of said fish hook.

HIRAM H. HILDEBRANDT.